US010014751B2

(12) United States Patent
Raminosoa et al.

(10) Patent No.: US 10,014,751 B2
(45) Date of Patent: Jul. 3, 2018

(54) ELECTRICAL MACHINE COOLING STRUCTURE

(71) Applicant: GENERAL ELECTRIC COMPANY, Schenectady, NY (US)

(72) Inventors: Tsarafidy Raminosoa, Niskayuna, NY (US); Karthik Kumar Bodla, Niskayuna, NY (US); Ayman Mohamed Fawzi El-Refaie, Niskayuna, NY (US); David Allan Torrey, Ballston Spa, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 239 days.

(21) Appl. No.: 14/716,415

(22) Filed: May 19, 2015

(65) Prior Publication Data
US 2016/0344264 A1 Nov. 24, 2016

(51) Int. Cl.
*H02K 3/30* (2006.01)
*H02K 9/22* (2006.01)
*H02K 3/34* (2006.01)

(52) U.S. Cl.
CPC .................. *H02K 9/22* (2013.01); *H02K 3/30* (2013.01); *H02K 3/345* (2013.01)

(58) Field of Classification Search
CPC ............ H02K 9/22; H02K 3/30; H02K 3/345
USPC .......................................................... 310/54
See application file for complete search history.

(56) References Cited

U.S. PATENT DOCUMENTS

| 8,513,842 B2 | 8/2013 | Iwasaki et al. |
| 2004/0084987 A1 | 5/2004 | Leijon |
| 2005/0051538 A1* | 3/2005 | Guckert ............... F28F 21/02 219/544 |
| 2006/0220320 A1 | 10/2006 | Potier et al. |
| 2008/0220282 A1* | 9/2008 | Jang ................. B32B 15/08 428/689 |
| 2011/0074253 A1* | 3/2011 | Hino ................ F03G 7/005 310/365 |

(Continued)

FOREIGN PATENT DOCUMENTS

| EP | 3116104 A1 * | 1/2017 | ............ H02K 3/345 |
| JP | 2005197668 A * | 7/2005 | |

(Continued)

OTHER PUBLICATIONS

Smalc et al., "Thermal Performance of Natural Graphite Heat Spreaders", Proceedings of IPACK2005, ASME InterPACK '05, Jul. 17-22, 2005, pp. 1-11.

(Continued)

*Primary Examiner* — Forrest M Phillips
(74) *Attorney, Agent, or Firm* — GE Global Patent Operation; Pabitra K. Chakrabarti

(57) ABSTRACT

A stator assembly that includes a graphite sheet-like element that has fold(s) so as to define at least two planar sections. The face of one of the planar section abuts a surface of a heat generating location(s) of the stator assembly and a face of another planar section abuts one the tooth or the slot bottom of the stator assembly. Also, a subassembly that includes an electrical machine stator assembly that includes a sheet-like element of a material having high thermal conductivity, wherein a portion of the element abuts the end winding(s) such that the sheet-like element conducts heat to the magnetic core, the stator housing, and/or a winding heat conduction element.

23 Claims, 10 Drawing Sheets

(56) References Cited

U.S. PATENT DOCUMENTS

| | | | |
|---|---|---|---|
| 2011/0232881 A1* | 9/2011 | Downing | F28F 3/025 |
| | | | 165/133 |
| 2011/0234028 A1* | 9/2011 | Iwasaki | H02K 9/22 |
| | | | 310/52 |
| 2011/0278971 A1* | 11/2011 | Matsumoto | H02K 5/08 |
| | | | 310/64 |
| 2013/0280470 A1 | 10/2013 | Norly | |
| 2014/0183984 A1* | 7/2014 | Kobayashi | H02K 5/08 |
| | | | 310/43 |
| 2014/0224466 A1* | 8/2014 | Lin | B82Y 30/00 |
| | | | 165/185 |
| 2014/0248515 A1* | 9/2014 | Wayne | H01M 10/647 |
| | | | 429/82 |
| 2015/0233739 A1* | 8/2015 | Cranch | G01D 5/35316 |
| | | | 385/13 |
| 2016/0380517 A1* | 12/2016 | Yonemori | H02K 9/22 |
| | | | 310/53 |

FOREIGN PATENT DOCUMENTS

| | | | |
|---|---|---|---|
| WO | 2009025093 A1 | 2/2009 | |
| WO | 2013023969 A2 | 2/2013 | |

OTHER PUBLICATIONS

Grafham, "Optimal thermal management of planar magnetics in high frequency SMPS", http://www.paytongroup.com/webfiles/files/10_Application_Note_001.pdf, Payton Planar Magnetics, 1 page, downloaded on Mar. 4, 2015.

* cited by examiner

ELECTRICAL MACHINE COOLING STRUCTURE

STATEMENT REGARDING FEDERALLY SPONSORED RESEARCH & DEVELOPMENT

This invention was made with U.S. Department of Energy support under contract number DE-EE0005573. The Government has certain rights in the invention.

BACKGROUND

The present invention relates generally to electrical machines and more particularly to a cooling structure for use with electrical machines.

Higher temperatures in electrical machines can be the source of performance degradation, decrease in power density, and reduction in reliability for the machine. Thermal "hot spots" may be a specific manifestation of this issue. Within the stator assembly and at or near the end windings, in particular, is often the hottest portion of the stator. Effective extraction of heat in these areas can be difficult.

Copper losses, often the most significant losses in an electrical machine, are generated by the winding conductors located in winding slots within the lamination stack of the machine. Heat generated, due to ohmic losses within the conductors, has to travel through insulation layers (e.g., ground wall, phase separators, conductor coating, VPI resin, etc.). Due to the poor thermal conductivity of the various insulation layers, the conductors within the winding slots are often among the hottest parts of the electrical machine.

Accordingly, there is an ongoing need for improving upon thermal management in electrical machines.

BRIEF DESCRIPTION

The present invention overcomes at least some of the aforementioned drawbacks by providing an electrical machine cooling structure. More specifically, the present invention is directed to a cooling structure that improves thermal management when used in electrical machines thereby increasing power density and improving reliability.

Therefore, in accordance with one aspect of the invention, a stator assembly comprises: a magnetic core having a plurality of slots for housing one or more coil sides, a region between adjacent slots defined as a tooth, a region facing a rotor assembly defined as a slot bottom, the slot bottom forming a surface of a back iron or yoke; a plurality of phase windings housed in the magnetic core, configured to create a magnetic field within the magnetic core; a first insulation subsystem configured to provide electrical separation between the magnetic core and the plurality of phase windings; a second insulation subsystem configured to provide electrical separation amongst the plurality of phase windings; and a sheet-like element comprising graphite, said sheet-like element having at least one fold thereby defining a first planar section and a second planar section, wherein a face of the first planar section abuts a surface of a heat generating location of the stator assembly and a face of the second planar section abuts one of the tooth and the slot bottom.

In accordance with another aspect of the present invention, a subassembly comprises: an electrical machine stator assembly having at least one end winding, a magnetic core, a stator housing, and a winding heat conduction element; and a sheet-like element comprising a material having high thermal conductivity, wherein a portion of the sheet-like element abuts the at least one end winding, wherein the sheet-like element conducts heat to one or more of the magnetic core, the stator housing, and a winding heat conduction element.

Various other features and advantages of the present invention will be made apparent from the following detailed description and the drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
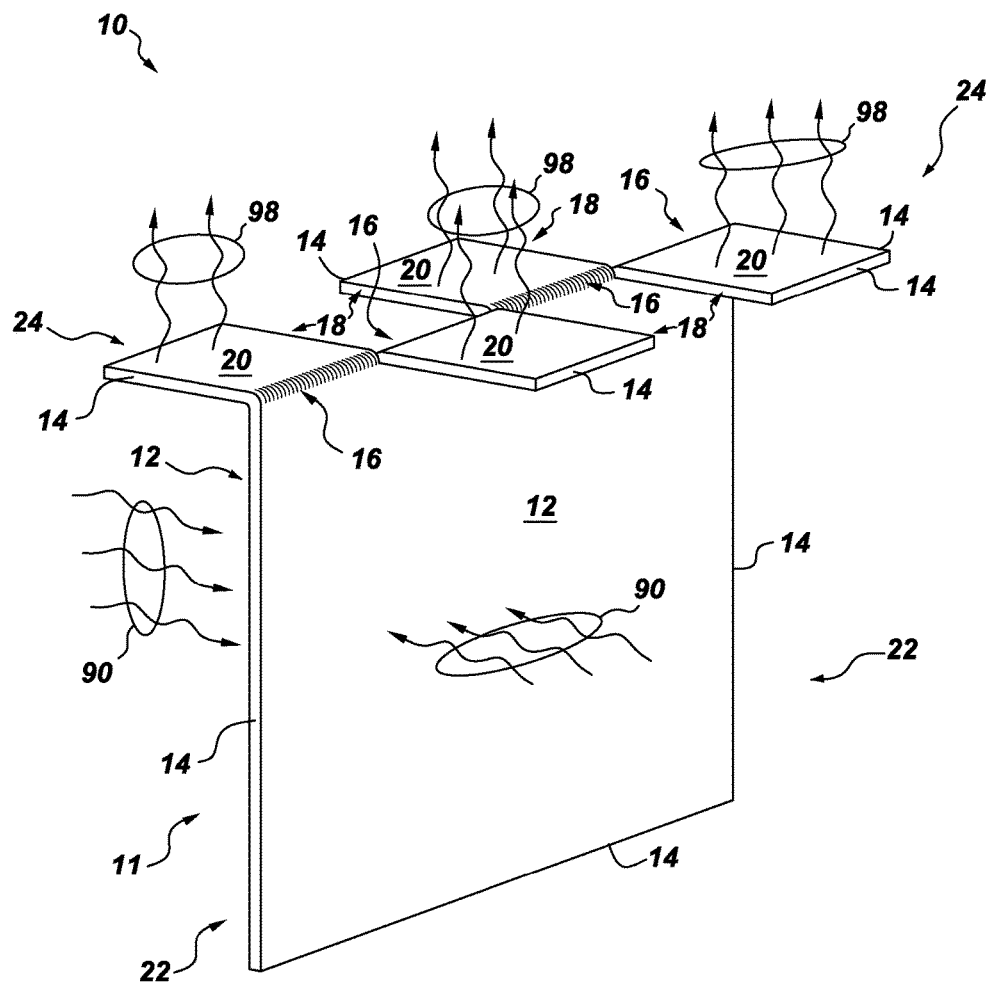
FIG. 1 is a perspective view of an electrical machine cooling structure according to an embodiment of the present invention.

Unless defined otherwise, technical and scientific terms used herein have the same meaning as is commonly understood by one of ordinary skill in the art with respect to the presently disclosed subject matter. The terms "first", "second", and the like, as used herein do not denote any order, quantity, or importance, but rather are used to distinguish one element from another. The terms "a", "an", and "the" do not denote a limitation of quantity, but rather denote the presence of at least one of the referenced item, and the terms "front", "back", "bottom", and/or "top", unless otherwise noted, are used for convenience of description only, and are not limited to any one position or spatial orientation.

If ranges are disclosed, the endpoints of all ranges directed to the same component or property are inclusive and independently combinable (e.g., ranges of "up to about 25 wt. %," is inclusive of the endpoints and all intermediate values of the ranges of "about 5 wt. % to about 25 wt. %," etc.). The modified "about" used in connection with a quantity is inclusive of the stated value and has the meaning dictated by the context (e.g., includes the degree of error associated with measurement of the particular quantity). Accordingly, the value modified by the term "about" is not necessarily limited only to the precise value specified.

As used herein, "high thermal conductivity" means having a thermal conductivity above about 1 W/m-K.

As used herein, "sheet-like element" means an element having a thickness substantially less than the width and length of the element.

The cooling structure may comprise one or more sheet-like elements. The sheet-like element is made of a suitable material that has a high thermal conductivity, high degree of flexibility, and/or ease of cutting, trimming, and the like. The dimensions of the sheet-like element can be any suitable length, width, and thickness. By example only, a typical size of a sheet-like element may be about 2 in.×7 in. for a rectangular piece. Thickness for suitable sheet-like element varies. By example only, typical thickness of a sheet-like element may be in a range from about 17-about 100 μm (about 0.66-about 4 mils).

One suitable material for the sheet-like element is graphite in that graphite has exceptionally high thermal conductivity in privileged directions (i.e., anisotropic), a high degree of flexibility, and ease of cutting/trimming. Although graphite sheets exhibit anisotropic attributes with regard to thermal conductivity, the sheet-like elements need not be anisotropic. Other suitable materials now known or later developed may include, for example, aluminum nitride, boron nitride, silicon carbide, and the like. A combination of materials can be also used in the cooling structure.

The material(s) that make up the cooling structure should have a high thermal conductivity. Specifically, the thermal conductivity should be higher that the inherent thermal conductivity of the adjacent machine elements (i.e., slots, winding and resin, etc.) to the cooling structure. The slots (e.g., winding and resin) have a thermal conductivity less than about 1 W/m-K. In some embodiments, the thermal conductivity of the cooling structure is above about 10 W/m-K. In other embodiments, wherein the sheet-like elements are made of graphite, the thermal conductivity is in a range from about 650-1,799 W/m-K.

The cooling structure can be used within a stator assembly and/or a rotor assembly of an electrical machine. In a typical embodiment, a plurality of cooling structures (the quantity of which depending on the configuration of the particular electrical machine) can be used in the electrical machines.

Referring to FIG. 1, a perspective view of an exemplary cooling structure 10 is shown. The cooling structure 10 may comprise a sheet-like element 11 that has faces 12. As shown, at the ends of the faces 12 are edges 14. In the embodiment shown, there are cuts/tears 18 that when portions of the sheet-like element 11 are bent at folds 16, extensions 20 are defined. The embodiment shown has four extensions 20 that collectively define a second planar section 24 that is not co-planar from the first planar section 22. The second planar section 24 may be approximately normal to the first planar section 22. In other embodiments, the second planar section 24 may have an angle, other than 90 degrees, with the first planar section 22. The second planar section 24 may be smaller, larger, or the same size in area than the first planar section 22. Either planar section 22, 24 may be configured to follow a curved shape, as in a winding slot surface that is curved.

For illustrative purposes, the surrounding environment (e.g., stator assembly portions, rotor assembly portions, etc.) to the cooling structure 10 is not shown. Heat from portions of the electrical machine (not shown) thermally conducts to faces 12 of the first planar section 22. Due to the thermal conductivity properties of the graphite, the heat that conducts to the faces 12, depicted as 90, is conducted in plane toward the distal portion(s) of the cooling structure 10 toward the extensions 20 and/or second planar section 24. The heat then dissipates from the faces 12 of the extensions 20 as depicted by 98. In this manner, a structure 10 having improved thermal management properties is shown.

As will be discussed and shown, the face(s) 12 of the cooling structure 10 may abut one or more portions of an electrical machine 300. By abutting, the face(s) 12 need not be in physical contact with an electrical machine element. In embodiments, the face(s) 12 may physically contact one or more element(s) of the machine. In other embodiments, the face(s) 12 do not physically contact one or more element of the machine, but are close enough so that thermal conductivity may take place from the machine to the cooling structure 10.

Figure 2:
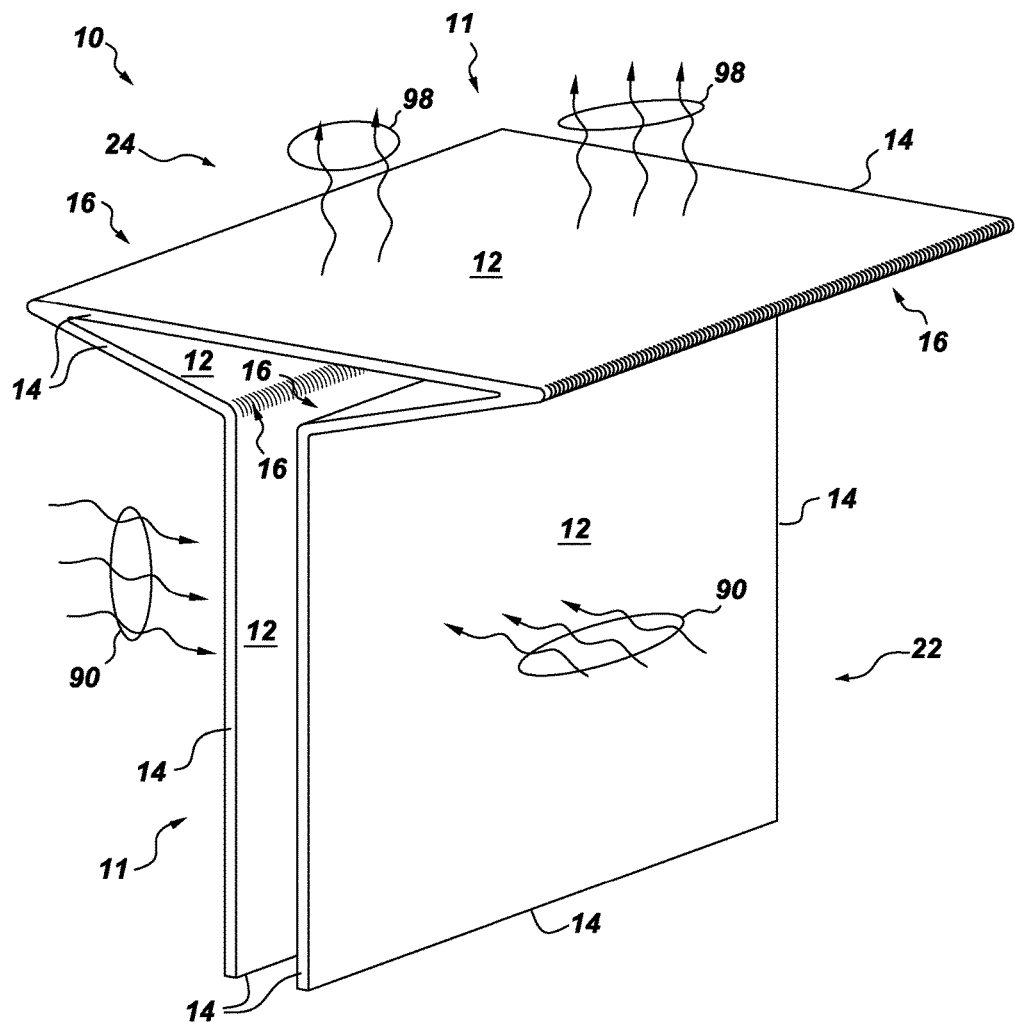
FIG. 2 is a perspective view of an electrical machine cooling structure according to another embodiment of the present invention.

Referring FIG. 2, a perspective view of another electrical machine cooling structure is shown at 10. For illustrative purposes only, the structure 10 is shown slightly unfolded from the finished position the structure 10 would likely have when fully installed in an electrical machine. As depicted, the structure 10 receives heat at 90 along two opposed faces 12 that define a first planar section 22. Due to the material properties of the sheet 11, the heat travels along the plurality of faces 12 and first planar section 22. Heat ultimately leaves the structure 10 along the upper, horizontal face 12 of a second planar section 24, as denoted at 98. The embodiment has a series of folds 16 separating the various faces 12 and planar sections 22, 24. When installed, an end-view of the embodiment of the cooling structure 10 is T-shaped. The first planar section 22 and second planar section 24 are not coplanar to each other and are normal to each other. In other embodiments, the first planar section 22 and second planar section 24 are not coplanar but have an angle that is other than approximately 90 degrees (i.e., not normal). Either planar section 22, 24 may be intended to follow a curved shape, as in a winding slot surface that is curved.

While the embodiments in FIGS. 1 and 2 depict approximately T-shaped cooling structures 10, other shapes are possible. Depending on the internal configuration of the electrical machine that the cooling structures 10 are used in, the shape (in end view) of the cooling structure 10 may include, but not be limited to, U-shaped, V-shaped, H-shaped, rectangular (including square), elliptical (including circular), curved, combinations thereof, and the like.

Figure 3:
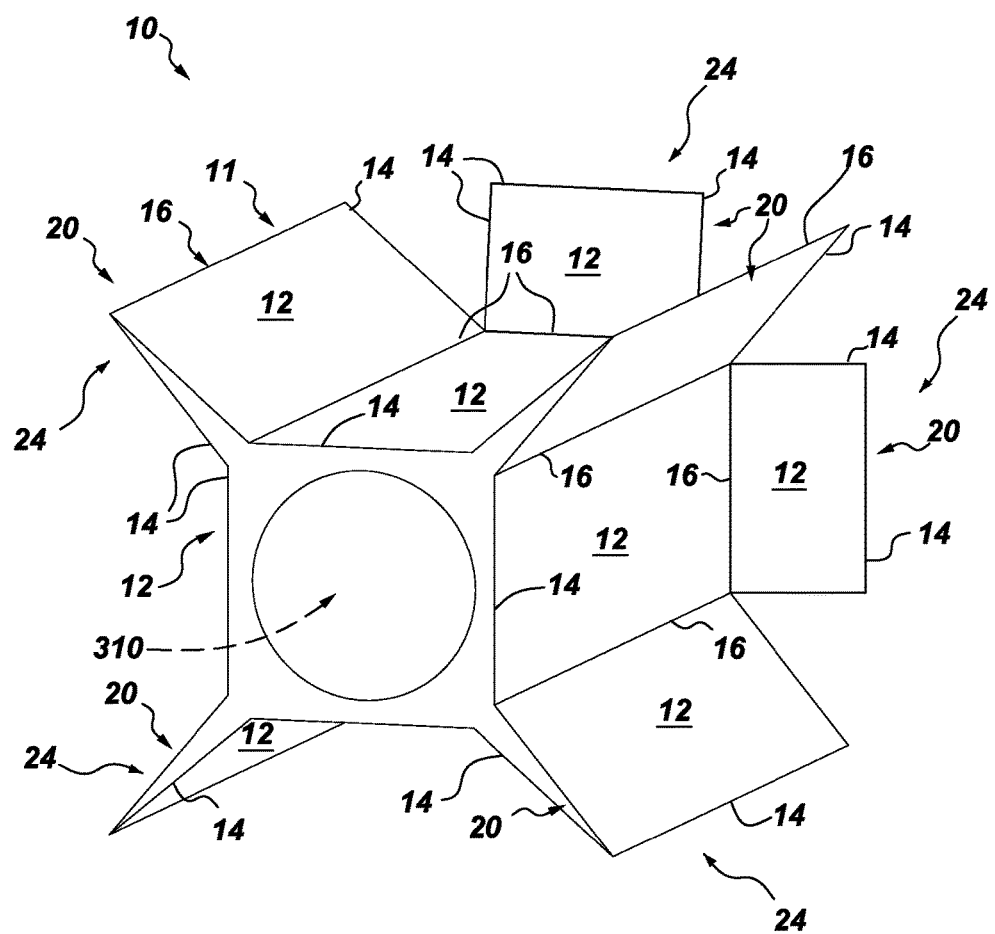
FIG. 3 is a perspective view of an electrical machine cooling structure according to another embodiment of the present invention.

Referring to FIG. 3, a perspective view of another electrical machine cooling structure is shown at 10. For illustrative purposes only, the structure 10 is shown slightly unfolded from the finished position the structure 10 would likely have when fully installed around, for example, end windings or end turns 310 of an electrical machine 300 (not shown). As depicted, the structure 10 has a plurality of cuts, or perforations, and folds 16. The structure 10 can consist of a plurality of faces 12 that are not coplanar with each other thereby defining a plurality of wings, or extensions 20. The various second planar sections 24 are configured to dispense heat that is gathered from the end windings 310 and then conducts along the various faces 12 of the structure 10.

Figure 4:
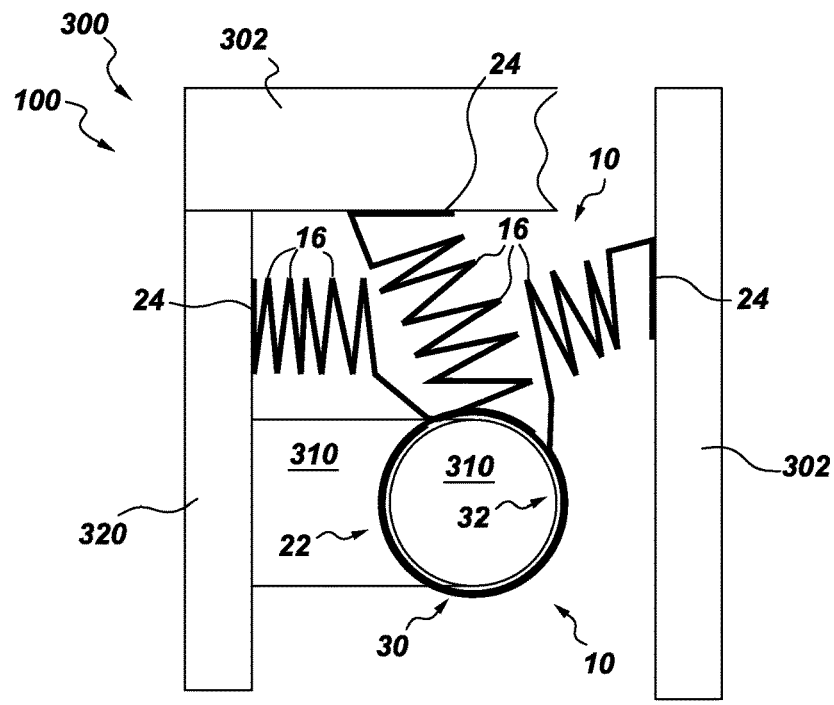
FIG. 4 is a sectional elevation view of an electrical machine cooling structure according to another embodiment of the present invention.

Referring to FIG. 4, a sectional elevation or side view of another electrical machine cooling structure 10 is shown. As depicted the cooling structure 10 may comprise a curved section 30 that may include a circular section 32 that at least partially surrounds the end turns of a winding 310 of an electrical machine 300. Extending from the circular section 32 are three elements, each comprising multiple folds 16 ending with a second planar section 24. As shown the plurality of second planar sections 24 abut the lamination stack 320 and/or portions of the housing 302 of the electrical machine 300. As shown each of the three elements of the structure 10 have an accordion-like configuration. The accordion-like configuration provides compliance with the movement of various elements of the machine 300 due to heat, vibration, and movement. Heat generated at or near the curved section 30 of the structure 10 can then effectively thermally conduct along the accordion-like sections ultimately passing to and then exiting from the plurality of second planar sections 24. It should be apparent that the quantity of folds in the sheet 11 of the cooling structure 10 may vary from the embodiment depicted. In an embodiment, the quantity of folds can be such so that the same side of the face 12 of the sheet 11 abuts both the heat generating element(s) of the machine 10 (e.g., end windings 310) and the heat sink element of the machine 10 (e.g., lamination 320, housing 302, etc.).

Figure 5:
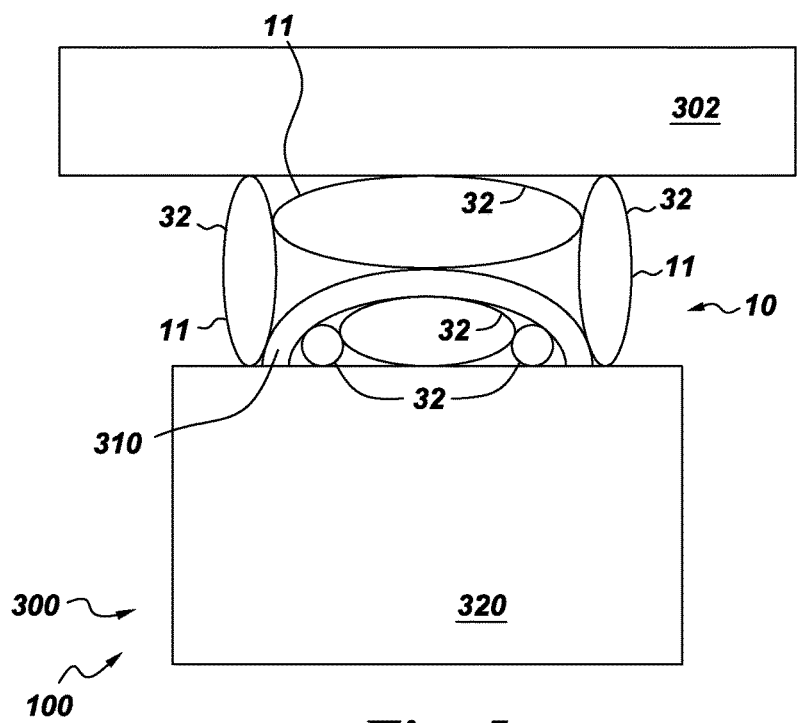
FIG. 5 is a sectional top view of an electrical machine cooling structure according to another embodiment of the present invention.

Referring to FIG. 5, a sectional top view of another electrical machine cooling structure 10 is shown. As depicted, the cooling structure 10 may comprise a plurality of abutting elements that each comprises a sheet 11 having an elliptical cross-section 32. There are six total elliptical sections 32, wherein three abutting elliptical sections 32 are on the outside of the end windings 310 of the machine and three abutting elliptical sections 32 are on the inside of the end windings 310 that extend beyond the laminations 320. Two of the three elliptical sections 32 on the inside region of the end windings 310 have a circular configuration. The various elliptical sections 32 abut both the end windings 310, each other, and the outer portion(s) of the machine 300. In this manner, heat generated at, or near, the end windings 310 conducts away from the windings 310, through the cooling structure 10, to the housing 302 of the machine 300, thereby offering an effective thermal management platform for the machine 300.

Figure 6:
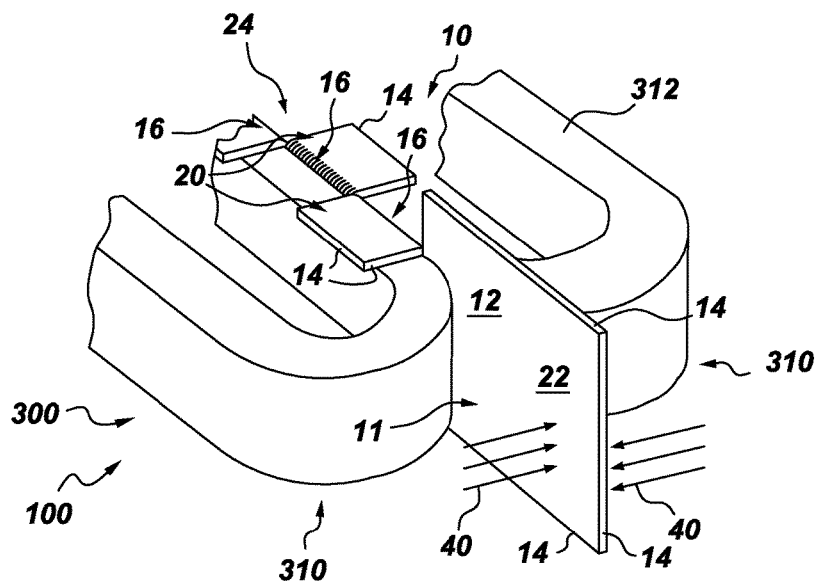
FIG. 6 is a perspective view of an electrical machine cooling structure between end windings according to another embodiment of the present invention.

Referring to FIG. 6, a perspective view of an electrical machine cooling structure 10 between adjacent windings 312 of an electrical machine 300 is shown. For clarity the lamination stack of the machine is not shown. The cooling structure 10, which is similar in aspects to the embodiment depicted in FIG. 1, includes a first planar section 22 that is between the windings 312 and extends beyond the end windings or end turns 310. A second planar section 24 comprises three wings, or extensions, 20 that abut the top portion of the windings 312, within the winding slot of the magnetic core (not shown). Heat generated within the windings 312 conducts to first planar section 22 and can then conduct to the exposed face 12 of first planar section 22 or to second planar section 24. Heat generated at or near the end windings 310 conducts away from the end windings 310 to the second planar section 24 along the face 12 of the structure 10 towards the first planar section 22. Fluid (e.g., oil, air, a water/glycol mixture, etc.) may be injected against the face 12 of the first planar section 22 of the structure 10 to provide additional cooling means as denoted by 40.

Figure 7A:
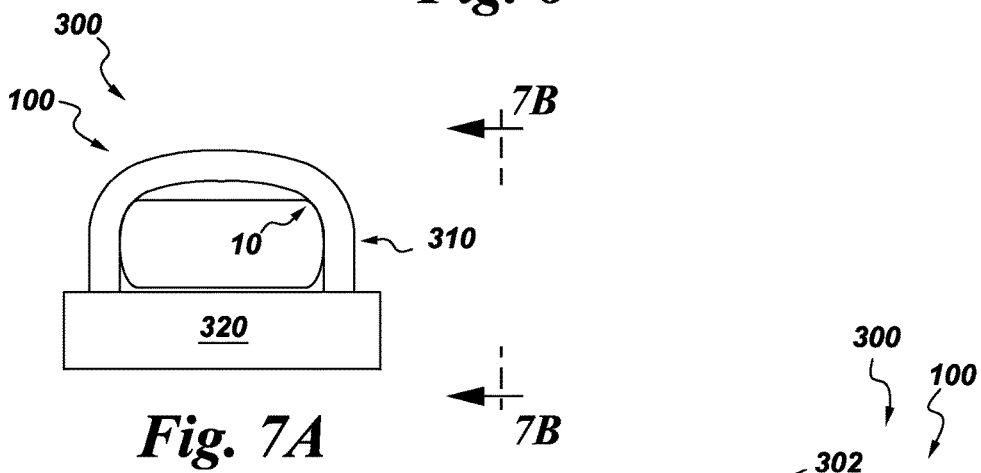
FIG. 7A is a sectional top view of an electrical machine cooling structure according to another embodiment of the present invention.
Figure 7B:
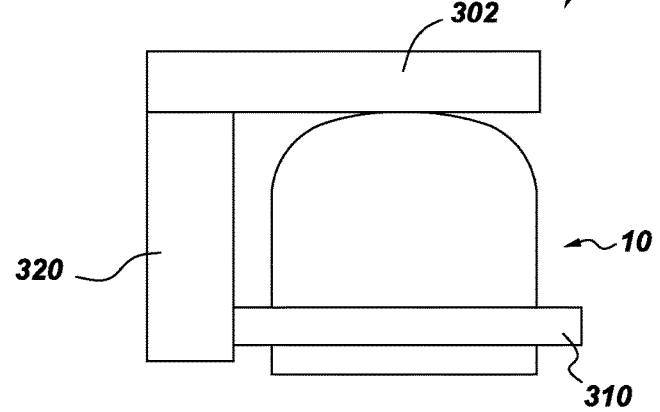
FIG. 7B is a sectional elevation view of the electrical machine cooling structure of FIG. 7A.

Referring collectively to FIGS. 7A and 7B, sectional top and side elevation views, respectively, of an electrical machine cooling structure 10 are shown. The cooling structure 10 abuts the end turns 310 that extend beyond the laminations 320, as shown in FIG. 7A. The heat from the end turns 310 is thermally conducted to housing (e.g., end bell) 302 of the electrical machine as shown in FIG. 7B. As shown a cross section of the cooling structure 10 may form an enclosed loop (see FIG. 7A) that is rectangular with curved corners, or of any other shape that seeks to maximize the contact area with the end turns 310.

Figure 8A:
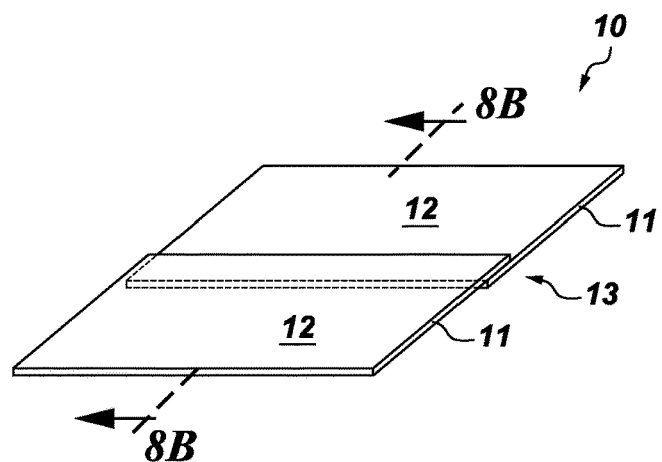
FIG. 8A is a perspective view of a portion of an electrical machine cooling structure according to an embodiment of the present invention.
Figure 8B:
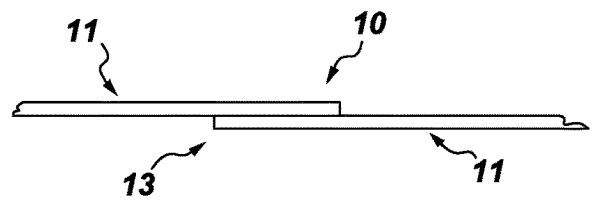
FIG. 8B is a sectional elevation view of the portion in FIG. 8A.

Referring collectively to FIGS. 8A and 8B, perspective and sectional elevation views, respectively, of a portion of an electrical machine cooling structure 10 are shown. The figures depict a plurality of sheets 11 adjoined so as to comprise a single face 12 or planar section. As shown, the sheets 11 may overlap in a region 13 so as to suitably form a single monolithic sheet 11 for the structure 10. In the overlap region 13, suitable adhesive may be used. In this manner, a sheet-like structure can be made by a single sheet 11 of material or from multiple sheets 11 of material.

Figure 9:
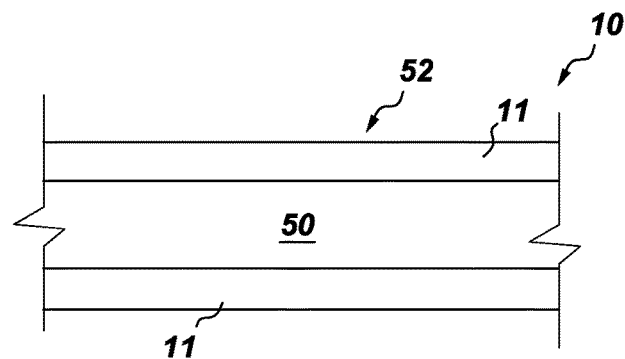
FIG. 9 is a sectional elevation view of a portion of an electrical machine cooling structure according to another embodiment of the present invention.
Figure 10:
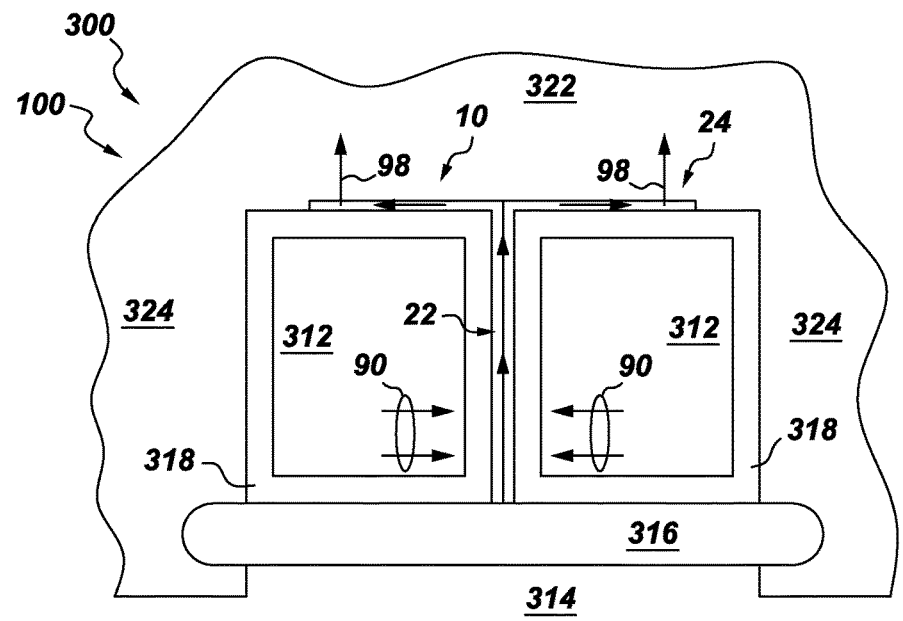
FIG. 10 is a sectional elevation view of an electrical machine cooling structure between coil sides within a winding slot according to another embodiment of the present invention.
Figure 11:
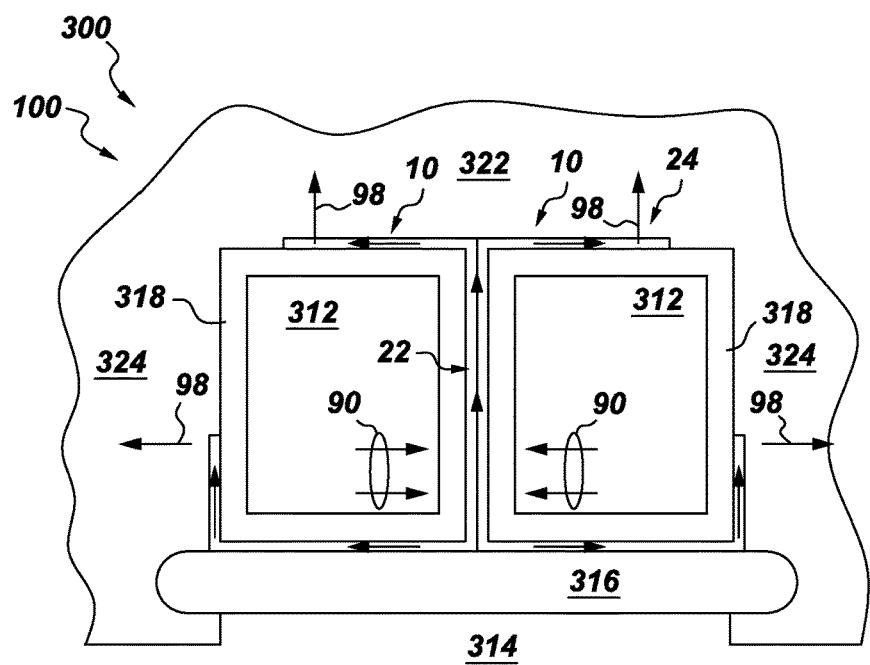
FIG. 11 is a sectional elevation view of an electrical machine cooling structure between coil sides within a winding slot according to another embodiment of the present invention.
Figure 12:
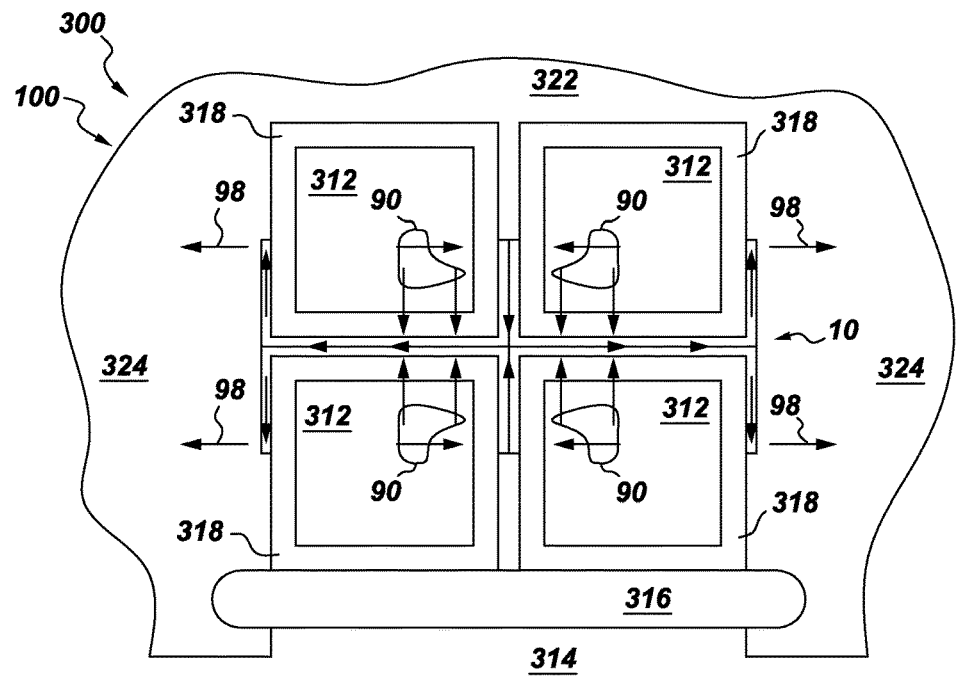
FIG. 12 is a sectional elevation view of an electrical machine cooling structure between coil sides within a winding slot according to another embodiment of the present invention.
Figure 13:
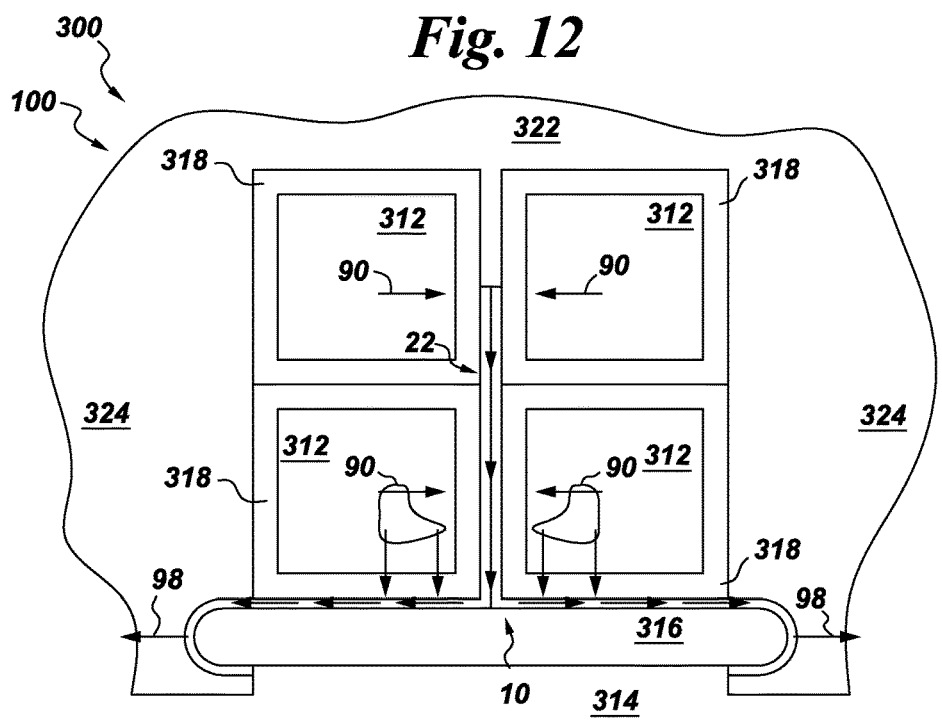
FIG. 13 is a sectional elevation view of an electrical machine cooling structure between coil sides within a winding slot according to another embodiment of the present invention.
Figure 14:
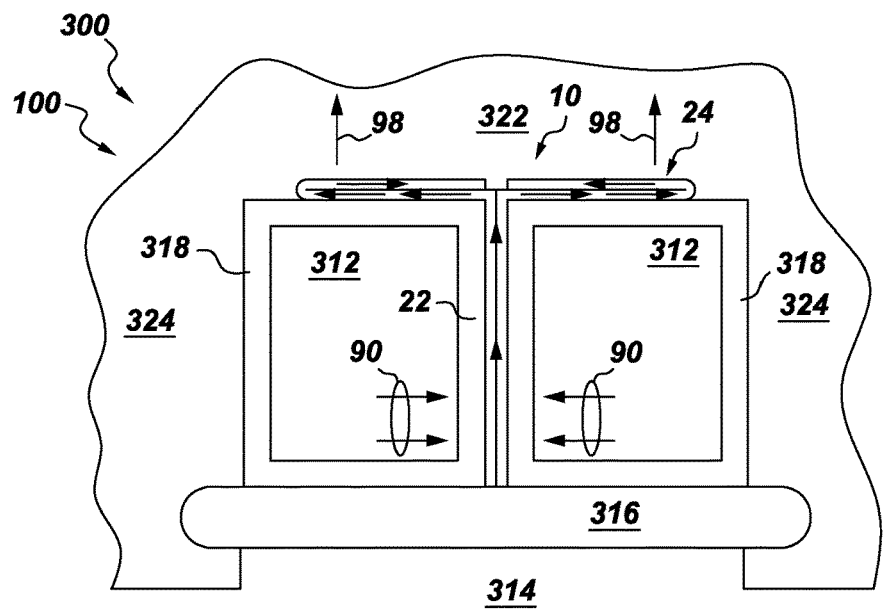
FIG. 14 is a sectional elevation view of an electrical machine cooling structure between coil sides within a winding slot according to another embodiment of the present invention.
Figure 15:
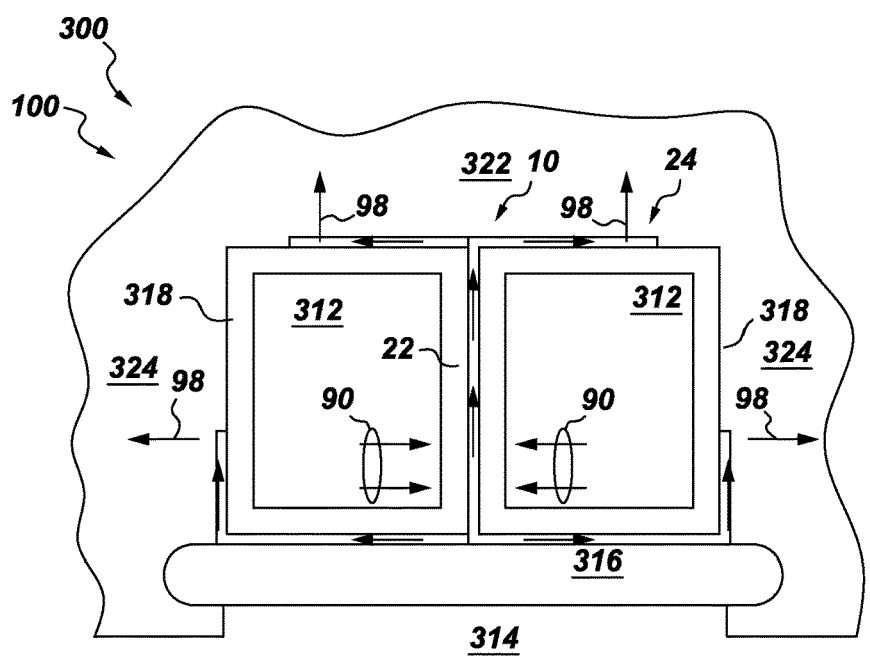
FIG. 15 is a sectional elevation view of an electrical machine cooling structure between coil sides within a winding slot according to another embodiment of the present invention.

Referring to FIG. 9, a sectional elevation view of a portion of an electrical machine cooling structure 10 is shown. The structure 10 may include a laminate construct 52 such that one or more sheets 11 adjoin an insulation layer 50. Although the figure depicts two sheets 11 with an insulation layer 50 there between, it should be apparent that other configurations are possible. For example, a single sheet 11 could adjoin one or more insulation layers 50. Similarly, the laminate construct 52 may comprise a plurality of insulation layers 50 just as there may be more than two sheets 11.

Referring collectively to FIGS. 10-15 sectional elevation views of various electrical machine cooling structure 10 embodiments are shown. Various elements of the machine 310 are depicted including insulation 318 that may surround windings 312. The windings 312 and insulation 318 may abut a slot wedge 316 which, in turn, abuts an air gap 314. Distal from the air gap 314 is the back iron 322. On either side of the windings 312 is the tooth 324.

Heat generated at, or near, the windings 312 flows towards the face of the cooling structure 10, as denoted by 90. The escaping heat thermally conducts along the plane(s) of the cooling structure 10, ultimately leaving the structure 10, as denoted by 98. As shown, portions of the cooling structure 10 are located between the windings 312 and insulation 318. The cooling structure 10 may at least partially surround the windings 312 and insulation 318.

Depending on the embodiment, the heat leaving 98 the structure 10 may thermally conduct to, for example, the tooth 324 and/or the back iron 322 of the machine 300.

Figure 16:
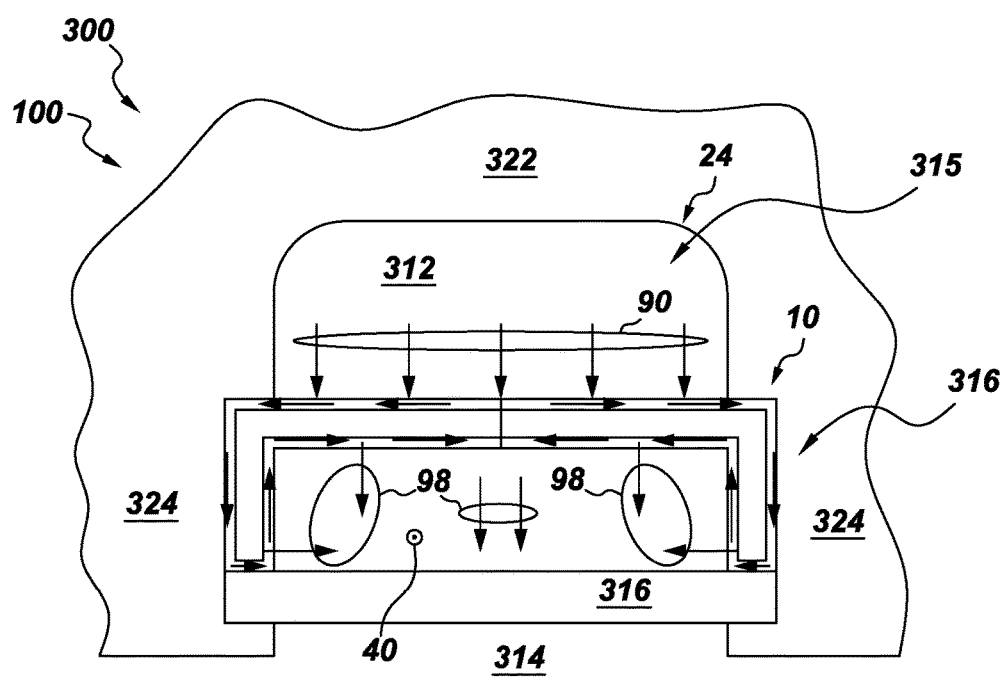
FIG. 16 is a sectional elevation view of an electrical machine cooling structure around coil sides within a winding slot according to another embodiment of the present invention.

Referring to FIG. 16, a sectional elevation view of an electrical machine cooling structure 10 is shown. The structure 10 is configured in a loop or tube configuration abutting the slot wedge 316. As depicted, heat flows into a face 12 of the structure 10 at 90 from the windings 312. Heat flows along and in-plane in the structure 10. Ultimately, heat conducts away from the structure 10 to an interstitial region, as denoted by 98. As denoted by an arrow 40 out of the sheet of FIG. 16, the interstitial region may further receive a flow of cooling fluid 40. The cooling fluid 40 may comprise, for example, a water/glycol mixture, air, or oil.

While the embodiments illustrated and described herein may be used with a stator assembly of an electrical machine, the advantages of the invention could readily apply to rotor assemblies of electrical machines. Additionally, the thermal management system could conceivably be used in other machines, electrical or otherwise, where improvement in effective heat dissipation is sought.

Therefore, according to one embodiment of the present invention, a stator assembly comprises: a magnetic core having a plurality of slots for housing one or more coil sides, a region between adjacent slots defined as a tooth, a region facing a rotor assembly defined as a slot bottom, the slot bottom forming a surface of a back iron or yoke; a plurality of phase windings housed in the magnetic core, configured to create a magnetic field within the magnetic core; a first insulation subsystem configured to provide electrical separation between the magnetic core and the plurality of phase windings; a second insulation subsystem configured to provide electrical separation amongst the plurality of phase windings; and a sheet-like element comprising graphite, said sheet-like element having at least one fold thereby defining a first planar section and a second planar section, wherein a face of the first planar section abuts a surface of a heat generating location of the stator assembly and a face of the second planar section abuts one of the tooth and the slot bottom.

According to another embodiment of the present invention, a subassembly comprises: an electrical machine stator assembly having at least one end winding, a magnetic core, a stator housing, and a winding heat conduction element; and a sheet-like element comprising a material having high thermal conductivity, wherein a portion of the sheet-like element abuts the at least one end winding, wherein the sheet-like element conducts heat to one or more of the magnetic core, the stator housing, and a winding heat conduction element.

While only certain features of the invention have been illustrated and/or described herein, many modifications and changes will occur to those skilled in the art. Although individual embodiments are discussed, the present invention covers all combination of all of those embodiments. It is understood that the appended claims are intended to cover all such modification and changes as fall within the intent of the invention.

What is claimed is:

1. A stator assembly comprising:
   a magnetic core having a plurality of slots for housing one or more coil sides, a region between adjacent slots defined as a tooth, a region facing a rotor assembly defined as a slot bottom, the slot bottom forming a surface of a back iron or yoke;
   a plurality of phase windings housed in the magnetic core, configured to create a magnetic field within the magnetic core;
   a first insulation subsystem configured to provide electrical separation between the magnetic core and the plurality of phase windings;
   a second insulation subsystem configured to provide electrical separation amongst the plurality of phase windings; and
   a cooling structure comprising a sheet-like element comprising graphite with exceptionally high thermal conductivity in privileged directions, said sheet-like element having at least one fold thereby defining a first planar section and a second planar section, wherein a first side of a first face of the first planar section abuts a surface of a heat generating location of the stator assembly and the same first side of a second face of the second planar section abuts one of the tooth and the slot bottom, further wherein heat is conducted from the heat generating location to the first side of the first face of the first planar section and along the first face and in plane in the first planar section and along the second face and in-plane in the second planar section and heat is dissipated from the same first side of the second face of the second planar section to the one of the tooth and the slot bottom.

2. The stator assembly of claim 1, wherein the sheet-like element comprises a plurality of graphite sheets.

3. The stator assembly of claim 2, wherein the plurality of graphite sheets are attached to each other.

4. The stator assembly of claim 2, wherein the plurality of graphite sheets form a laminar structure.

5. The stator assembly of claim 4, wherein the laminar structure comprises an inert interstitial layer between the plurality of graphite sheets.

6. The stator assembly of claim 1, herein a portion of the sheet-like element is surrounded by a fluid.

7. The stator assembly of claim 6, wherein the fluid is one of: a water/glycol mixture, air, and oil.

8. The stator assembly of claim 1, wherein at least one of:
   the face of the first planar section contacts the surface of the heat generating location of the stator assembly; and
   the face of the second planar section contacts one of the tooth and the slot bottom.

9. The stator assembly of claim 1, wherein at least one of:
   the face of the first planar section thermally conducts and does not contact the suffice of the heat generating location of the stator assembly; and
   the face of the second planar section thermally conducts and does not contact one of the tooth and the slot bottom.

10. An electrical machine comprising:
    a rotor assembly comprising:
       a magnetic core having a plurality of slots for housing at least one of a coil side and a permanent magnet, wherein a region adjacent the plurality of slots is defined as a tooth, wherein a region facing a stator assembly is defined as a slot bottom, the slot bottom forming a surface of a back iron or a yoke;
       a plurality of windings housed in the magnetic core, configured to create a magnetic field within the magnetic core;
       a first insulation subsystem configured to provide electrical separation between the magnetic core and the plurality of windings; and a second insulation subsystem configured to provide electrical separation amongst the plurality of windings; and the stator assembly of claim 1 surrounding the rotor assembly, the electrical machine configured to convert energy between electrical and mechanical forms.

11. A subassembly comprising:

an electrical machine stator assembly having at least one end winding, a magnetic core, a stator housing, and a winding heat conduction element; and a cooling structure comprising a sheet-like element comprising a material having exceptionally high thermal conductivity in privileged directions, wherein a plurality of faces of a portion of the sheet-like element abuts the at least one end winding, wherein a first side of a first face of the sheet-like element abuts a surface of a heat generating location of the stator assembly and the same side of a second face of the sheet-like element abuts one or more of the magnetic core, the stator housing, and a winding heat conduction element, and further wherein the sheet-like element conducts heat along the plurality of faces and in-plane in the structure to the one or more of the magnetic core, the stator housing, and a winding heat conduction element.

12. The subassembly of claim 11, wherein the material comprises an thermally conductive anisotropic material.

13. The subassembly of claim 12, wherein the material has thermal conductivity through its thickness that is lower than thermal conductivity in-plane.

14. The subassembly of claim 11, wherein the material comprises graphite.

15. The subassembly of claim 11, wherein the sheet-like element has at least one fold, thereby defining a first planar section and a second planar section.

16. The subassembly of claim 11, wherein a portion of the sheet-like element is surrounded by a fluid.

17. The sub subassembly of claim 11, wherein the fluid is one of: air, a water/glycol mixture, and oil.

18. The subassembly of claim 11, wherein the sheet-like element comprises a tube.

19. The subassembly of claim 11, wherein the sheet-like element includes at least one cut and a fold, thereby defining a first section being non-coplanar with a second section.

20. The subassembly of claim 11, wherein the winding heat conduction element comprises a manifold haying a circulating fluid therein.

21. The subassembly of claim 11, the circulation fluid comprises one of: air, a water/glycol mixture, and oil.

22. The, subassembly of claim 11, wherein the portion of the sheet-like element that abuts the at least one end winding physically contacts the at least one end winding.

23. An electrical machine comprising:

a rotor assembly that is coaxial with the subassembly of claim 11, thereby defining the electrical machine.

* * * * *